United States Patent
Worsham et al.

(10) Patent No.: US 6,868,268 B2
(45) Date of Patent: Mar. 15, 2005

(54) AUDIO CALLING NAME AND NUMBER DELIVERY

(75) Inventors: James A. Worsham, Buford, GA (US); David A. Levine, Atlanta, GA (US); Greg N. Patterson, Atlanta, GA (US); Zhiqiang Zeeman Zhang, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 487 days.

(21) Appl. No.: 09/896,835

(22) Filed: Jun. 29, 2001

(65) Prior Publication Data

US 2003/0003927 A1 Jan. 2, 2003

(51) Int. Cl.$^7$ ................................................ H04M 3/42
(52) U.S. Cl. ....................... 455/415; 455/417; 455/433; 455/435; 379/67.1; 379/882.4; 379/211.03; 379/142.01; 379/88.19
(58) Field of Search .............................. 379/67.1, 88.24, 379/211.03, 142.01, 88.19; 455/417, 415, 433, 435; 204/275

(56) References Cited

U.S. PATENT DOCUMENTS

| | | | |
|---|---|---|---|
| 5,309,512 A | 5/1994 | Blackmon et al. | .......... 379/210 |
| 5,850,435 A | 12/1998 | Devillier | ..................... 379/374 |
| 6,343,120 B1 * | 1/2002 | Rhodes | .................. 379/142.01 |
| 6,505,163 B1 * | 1/2003 | Zhang et al. | ............... 704/275 |
| 6,618,588 B1 * | 9/2003 | Easley | ......................... 455/433 |

FOREIGN PATENT DOCUMENTS

| | | |
|---|---|---|
| EP | 0821511 A2 | 7/1997 |
| WO | WO 95/12948 | 5/1995 |
| WO | WO 97/50225 | 12/1997 |

* cited by examiner

*Primary Examiner*—David Hudspeth
*Assistant Examiner*—David Q Nguyen
(74) *Attorney, Agent, or Firm*—Merchant & Gould

(57) ABSTRACT

An audio calling name and calling number delivery method is disclosed. When a call is made from a calling party telephone to a called party telephone, a message is sent from an originating service switching point (SSP) associated with the calling party telephone to a terminating mobile switching center (MSC) associated with the wireless called party telephone. Typically, the message comprises the directory number of the calling party telephone. A wireless trigger is tripped at the terminating MSC and, in response, a query is sent to a service control point (SCP). A home location register (HLR) associated with the wireless telephone is queried to determine whether the wireless telephone is available. If the wireless telephone is available, then a name and a number associated with the calling party telephone is forwarded to a service node. The service node places a call to the wireless telephone and an audio annunciation of the name and the number is played to the called party.

20 Claims, 4 Drawing Sheets

US 6,868,268 B2

AUDIO CALLING NAME AND NUMBER DELIVERY

TECHNICAL FIELD

This invention relates to a method and system for providing telecommunications services, and even more particularly relates to providing an audio annunciation of a calling party's name and/or telephone number to a called party.

BACKGROUND OF THE INVENTION

Many telecommunications service providers provide caller ID service. Caller ID service displays caller ID information (such as a calling party's name and/or telephone number) to a called party. Presently, some wireline phones and wireless phones include liquid crystal displays (LCDs) or other types of displays that are used to display the caller ID information. However, some wireless and wireline phones do not include a display capable of displaying caller ID information.

One solution to provide caller ID service to wireline phones without displays is to connect a caller ID box to the wireline phone. The caller ID box includes a display for displaying the caller ID information when a telephone call is received. One drawback to the caller ID box is that it is typically located near a phone jack and may be far away from the wireline phone of the called party (particularly if the wireline phone is a cordless telephone). For example, a called party with a cordless wireline telephone may be sitting on a sofa watching television when a call is received. Even if the called party has the cordless wireline phone with them, the called party must move to wherever the caller ID box is to view the caller ID information. Another drawback of the caller ID box is that it does not work with wireless phones, such as cellular telephones.

Another drawback of current caller ID services is that the displayed caller ID information may be difficult to see for people with vision problems. Another problem with wireless phones is that the called party may be busy with another activity, such as driving, and may be unable to divert their eyes to view the caller ID display. If the caller ID information may not be viewed by the called party, then the called party must either answer the phone to find out who the calling party is or allow the call to go unanswered.

Thus, there is a need for a method and system for providing a caller ID service that does not require a display device.

SUMMARY OF THE INVENTION

In one embodiment, the invention comprises an audio calling name and calling number delivery method. When a call is made from a calling party telephone to a called party telephone, a message is sent from an originating service switching point (SSP) associated with the calling party telephone to a terminating mobile switching center (MSC) associated with the wireless called party telephone. Typically, the message comprises the directory number of the calling party telephone. A wireless trigger is tripped at the terminating MSC and, in response, a query is sent to a service control point (SCP). A home location register (HLR) associated with the wireless telephone is queried to determine whether the wireless telephone is available. If the wireless telephone is available, then a name and a number associated with the calling party telephone is forwarded to a service node. The service node places a call to the wireless telephone and an audio annunciation of the name and the number is played to the called party.

In one embodiment, the invention is a method for providing an audio calling name and number feature to a wireless telephone in association with a telephone call from a calling party telephone to the wireless telephone. A message (including the directory number of the calling party telephone) is sent from an originating service switching point (SSP) associated with the calling party telephone to a terminating mobile switching center (MSC) associated with the wireless telephone. A wireless trigger is tripped at the terminating MSC and, in response, a query is sent to a service control point (SCP). The SCP queries a home location register (HLR) associated with the wireless telephone to determine whether the wireless telephone is available and, if so, the SCP forwards a name and a number associated with the calling party telephone to a service node. The service node places a call from the service node to the wireless telephone and plays an audio annunciation of the name and the number.

In one embodiment, the SCP retrieves the name and the number from a database. In another embodiment, whether the called party has rejected the call is determined and, if so, then the outgoing call is dropped and an announcement is played to the calling party. The rejection may be an audible rejection from the called party, a keypad input rejection, etc.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
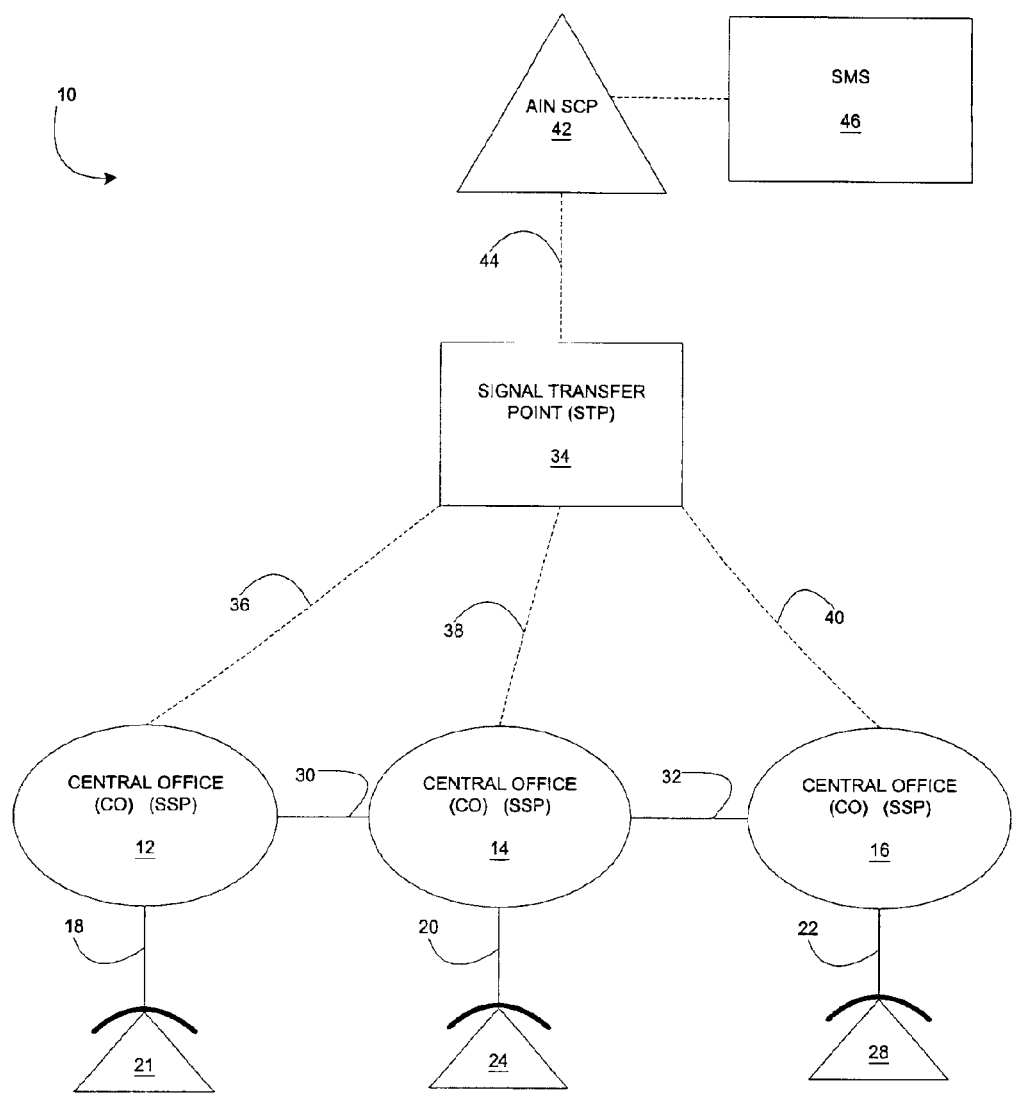
FIG. 1 is a block diagram of an exemplary advanced intelligent network (AIN).

The present invention is directed toward a method and system for providing an audio annunciation of a calling party's name and/or telephone number to a called party. In one embodiment, the invention is implemented as part of a telecommunications system including an advanced intelligent network (AIN).

Referring now to the drawings, in which like numerals represent like elements throughout the several figures, aspects of the present invention and the advanced intelligent network (AIN) will be described.

The modem public switched telephone network (PSTN) has separate signaling paths for voice signals (or other customer-utilized communication circuits) and for control signals, which include information transmitted throughout the network to control the connection and disconnection of the voice circuits. In the late 1970s and early 1980s, American Telephone & Telegraph Company (AT&T) developed an early species of common channel interoffice signaling (CCIS). CCIS is essentially a network architecture for a switched telephone network in which information about a telephone call is transmitted over high-speed data links that are separate from the voice circuits that are used to transmit the signals of the call itself. Early in the development of common channel interoffice signaling, it was recognized that the interoffice data signaling links could be designed to provide high-speed digital data that could first determine whether a call could be completed prior to assigning trunk capacity to set up the voice link. Thus, with common channel interoffice signaling, the identity of the dialed number can be transmitted over the interoffice signaling data links from the originating central office to the terminating central office, which is the central office that services the dialed or called number. CCIS offers benefits such as speeding up the setting up and tearing down of phone calls. CCIS also allows much more information (such as the calling number, a message, etc.) to be carried about the phone call than that carried on in-band signaling.

If the dialed number is busy, data representing this information is transmitted back over the interoffice signaling link to the originating central office that locally provides an audible busy signal to the caller. Therefore, no long distance trunk capacity is occupied during this process, and the voice circuits remain free for other uses. If the dialed number is not busy, various devices in the network respond to the information about this call to assign interoffice trunks to set up a connection for the call. While the call is being set up, the originating central office, based on a signal from the terminating central office, returns an audible ring back tone (RBT) to the caller. Once the dialed number is answered, an answer signal is passed from the terminating central office to the originating central office, the ring back tone is terminated, and the call is completed.

The public switched telephone network (PSTN) that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. As shown in FIG. 1, each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 1, central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by pay telephone 21 and standard telephone sets 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services.

Additional devices for implementing advanced network functions within the AIN 10 are provided by regional STPs (not shown), regional AIN SCPs (not shown), and a service management system (SMS) 46. The STP 34 is connected to the SSPs via connections 36, 38 and 40. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "timesout" and executes a default task for the communication. The reply to the query message may be a "conversation" message or a "response" message. Conversation messages allow for bidirectional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well-known to those skilled in the art and will not be further described herein. For more information regarding the AIN protocol, see Bellcore Specification GR-1298-CORE Switching Systems Generic Requirements for AIN 0.1, which is incorporated herein by reference.

Having described an exemplary AIN environment in reference to FIG. 1, an exemplary operating environment for the present invention will be described in reference to FIG. 2.

Figure 2:
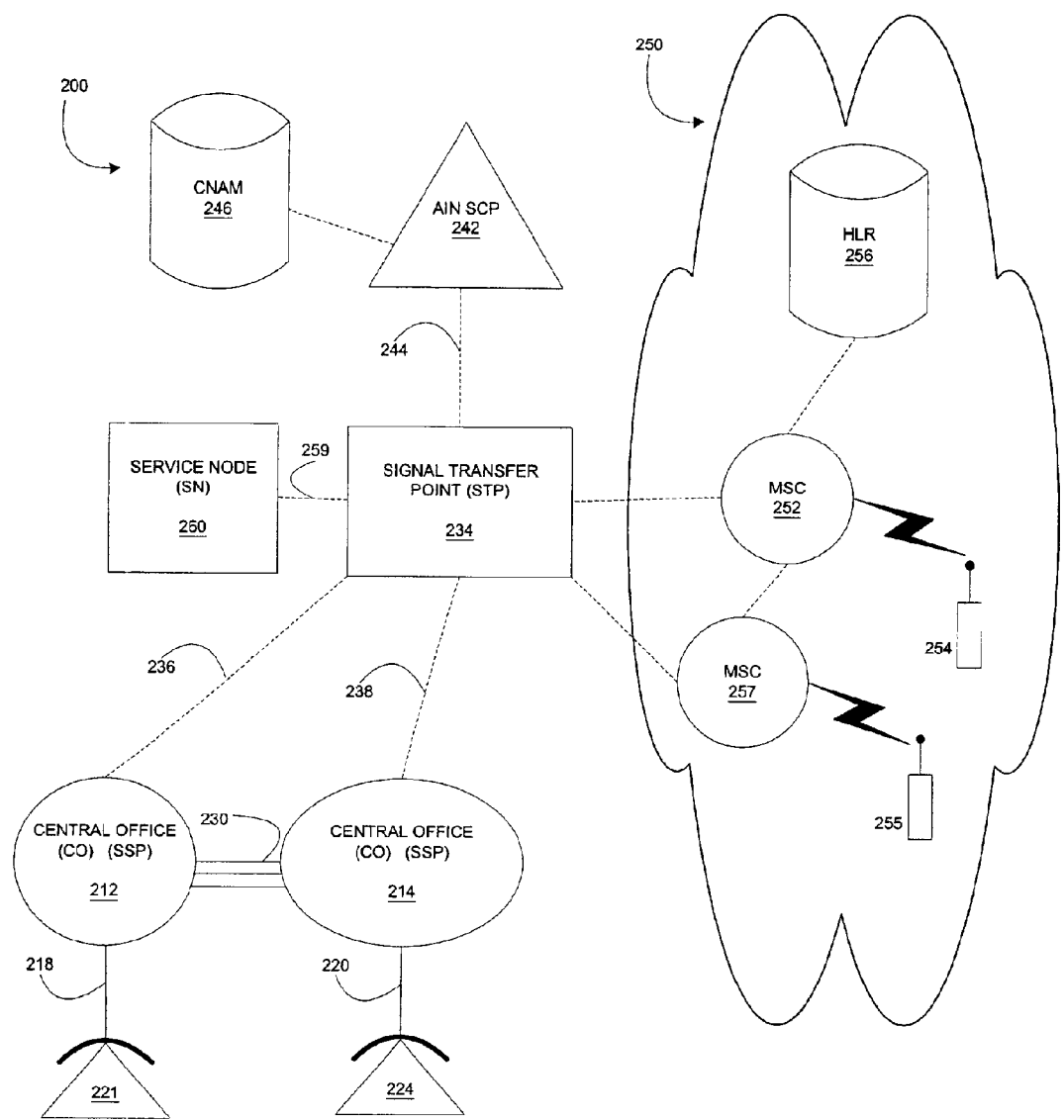
FIG. 2 is a block diagram illustrating an exemplary operating environment for an embodiment of the present invention

FIG. 2 is a block diagram illustrating an exemplary operating environment 200 for an embodiment of the present invention. The environment comprises a plurality of central offices switches (SSP) 212 and 214 with a plurality of subscriber lines 218 and 220 connected thereto. Each of the subscriber lines 218 and 220 is connected to a terminating piece or pieces of customer premises equipment that are represented by standard telephone sets 221 and 224. SSP switches 212 and 214 are connected by a plurality of trunk circuits indicated as 230. A signal transfer point (STP) 234 is connected to the SSPs via connections 236 and 238.

The environment 200 also comprises an AIN service control point (SCP) 242 that is connected to the STP 234 via SS7 data link 244. The AIN SCP 242 is also connected to a caller ID with name (CNAM) database 246. The CNAM database comprises a plurality of directory numbers along with an associated name for the directory number. The CNAM database may be used to provide a look-up database to provide caller ID service. The CNAM database may comprise directory numbers from wireline customers as well as wireless customers of wireless network 250.

The STP 234 may also be connected via a primary rate interface (PRI) 259 to a service node 260. The service node is used to implement functions such as voice-to-text and text-to-voice conversions, among other functions. Those skilled in the art are familiar with service circuit nodes, which are physically implemented by the same types of computers that embody the SCP 242. In addition to the computing capability and data base maintenance features, service nodes use ISDN lines and may include DTMF signal recognition devices, tone generation devices, voice synthesis devices and other voice or data resources. While service nodes are physically quite similar to the SCP 242, there are some important differences in the uses to which they are put.

Service control points, such as SCP 242, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber. By contrast, service nodes are used principally when some custom feature or service is needed that requires an audio connection to the call or transfer of a significant amount of data to a subscriber over a switched connection during or following a call.

The wireless network 250, such as a cellular network, comprises a plurality of mobile switching centers (MSC), such as MSCs 252 and 257. The MSCs are switches providing services and coordination between wireless users in network 250 and external networks. The MSCs may be connected to STP 234 to provide information to the wireline network and receive information from the wireline network. The MSCs also communicate with wireless subscribers, such as via wireless telephones 254 and 255.

The MSCs are connected to a home location register (HLR) 256. The HLR is an SS7 database used to identify/verify a wireless subscriber. The HLR also comprises data related to feature and services subscribed to by wireless subscribers. The HLR is also used during roaming to verify the legitimacy of the subscriber and to provide them with their subscribed features.

Figure 3:
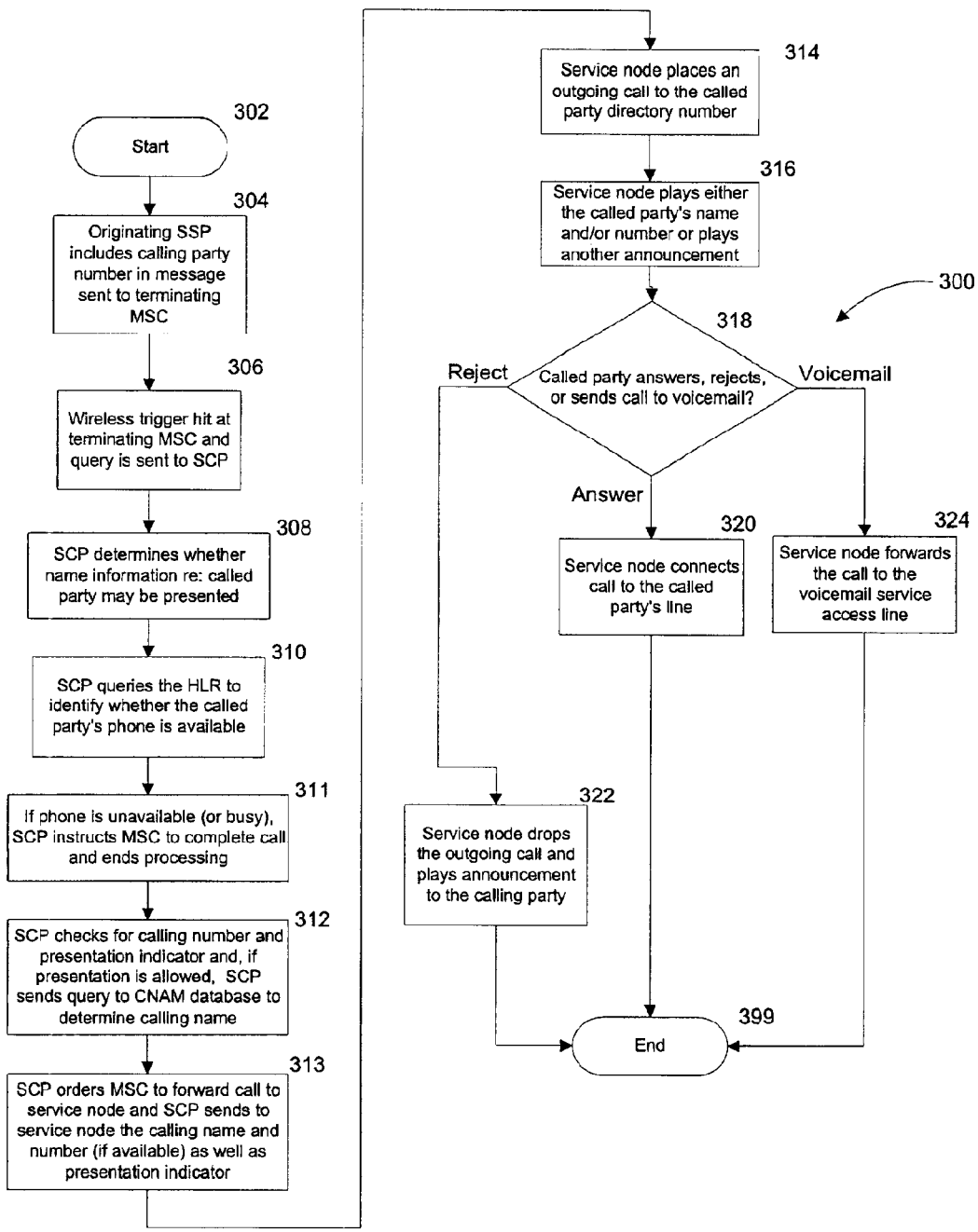
FIG. 3 is a flow diagram illustrating a method for providing audio calling party information to a wireless called party in accordance with an embodiment of the present invention.

Having described an exemplary operating environment above in reference to FIG. 2, a flow diagram illustrating a method 300 will be described in reference to FIG. 3. The method 300 is for providing an audio calling name and number service to a wireless called telephone in accordance with an embodiment of the present invention.

The method 300 begins at start step 302 when the calling party uses a telephone, such as telephone 221, to place a call to a called party's telephone, such as wireless telephone 254, by dialing a wireless called party number.

At step 304, the originating SSP 212 (or the originating MSC if the calling party is calling with a wireless phone) includes a calling party number in an SS7 message, such as an Integrated Services Digital Network User Part (ISUP) message, that is delivered to a terminating MSC 252 (associated with the called party's wireless phone). The calling party number is the directory number associated with the telephone 221 of the calling party.

At step 306, a wireless call termination trigger is hit at the terminating MSC 252 and a query is sent to the SCP 242. The wireless trigger may be a wireless intelligent network (WIN) trigger or another type of wireless trigger that initiates the query. When the SCP receives the query, it recognizes that the called party has an audio calling name/number service and that it needs to find an audio annunciation of the calling party's name as will be described below.

At step 308, the SCP 242 determines whether the calling party number is valid and whether name and number information regarding the calling party may be presented. For example, the calling party number may have a presentation indicator of "Presentation allowed", "Presentation restricted" or "Number Unavailable". An indicator of "Presentation restricted" means that the calling party has marked his number as private or has an unlisted phone number. An indication of "Number Unavailable" typically means that the calling party's number is not present, e.g., the terminating MSC did not receive the calling number through the SS7 ISUP message.

At step 310, the SCP queries the HLR 256 to identify whether the called party's wireless phone is available. In one embodiment, the query may be via an IS-41 location request. At step 311, if the called party's wireless phone is not available, then the SCP instructs the MSC to complete the call and ends processing. If the called party's wireless phone is available, then the method proceeds to step 312.

At step 312, the SCP 242 checks the calling number and presentation indicator corresponding to the calling party number and, if presentation is allowed, the SCP sends a query to the CNAM database to determine the calling name. The SCP may present the calling party number to the CNAM database, and in return it will get a text string with the name of the calling party, or it will get an "unavailable" or "unknown" result. If the calling party is calling from a cell phone served by the same wireless service provider of the called phone, a network element within the cell network may detect that the call comes from another cell phone within the network and then send a request to the appropriate database to get the calling name of the calling party. The method then proceeds to step 313.

At step 313, the SCP orders the MSC to forward the call to the service node and the SCP sends to the service node the calling name and number (if available) as well as the presentation indicator.

At step 314, the service node 260 places an outgoing call to the called party's directory number. The method then proceeds to step 316.

At step 316, when the called party answers the call, the service node 260 plays the called party's name and/or number to the called party. Alternatively, if the calling party's name/number is unavailable or private, a message indicating this may be played to the called party. It should be understood that if the name of the calling party is not available in the database, then the calling party's number may be audibly transmitted to the called party. For example, the caller may be calling from another country. The number may be available, but the national CNAM databases may not have the calling number (unless they can search foreign databases). Sometimes the database search may only return the city where the call originated in which case the origination city or locale may be audibly transmitted to the called party.

It should further be understood that, at step 316, if the calling party has marked his number as private or has an unlisted phone number then a message indicating that the call is a private call is audibly transmitted to the called party. The service node 260 may use well-known text-to-speech technology to convert the text of the calling party name/number into an audible communication. The method then proceeds to decision step 318.

At decision step 318, it is determined whether the called party has answered the call, rejected the call, or sent the call to voice mail. Typically, the called party may use their telephone keypad to direct the call. Alternatively, the called party may use some other indication such as giving an audible instruction to direct the call. If the called party has answered the call, then the method proceeds to step 320. At step 320, the service node 260 connects the call between the calling party's line and the called party's line. The method 300 then ends at step 399.

If it is determined at decision step 318 that the called party has rejected the call, then the method proceeds to step 322. At step 322, the service node 260 drops the outgoing call and plays an announcement to the calling party. The method then ends at step 399.

If, at decision step 318, it is determined that the called party has selected to send the call to voice mail, then the method proceeds to step 324. At step 324, the service node 260 forwards the call to the voice mail service access line for voice mail service. The method then ends at step 399.

Figure 4:
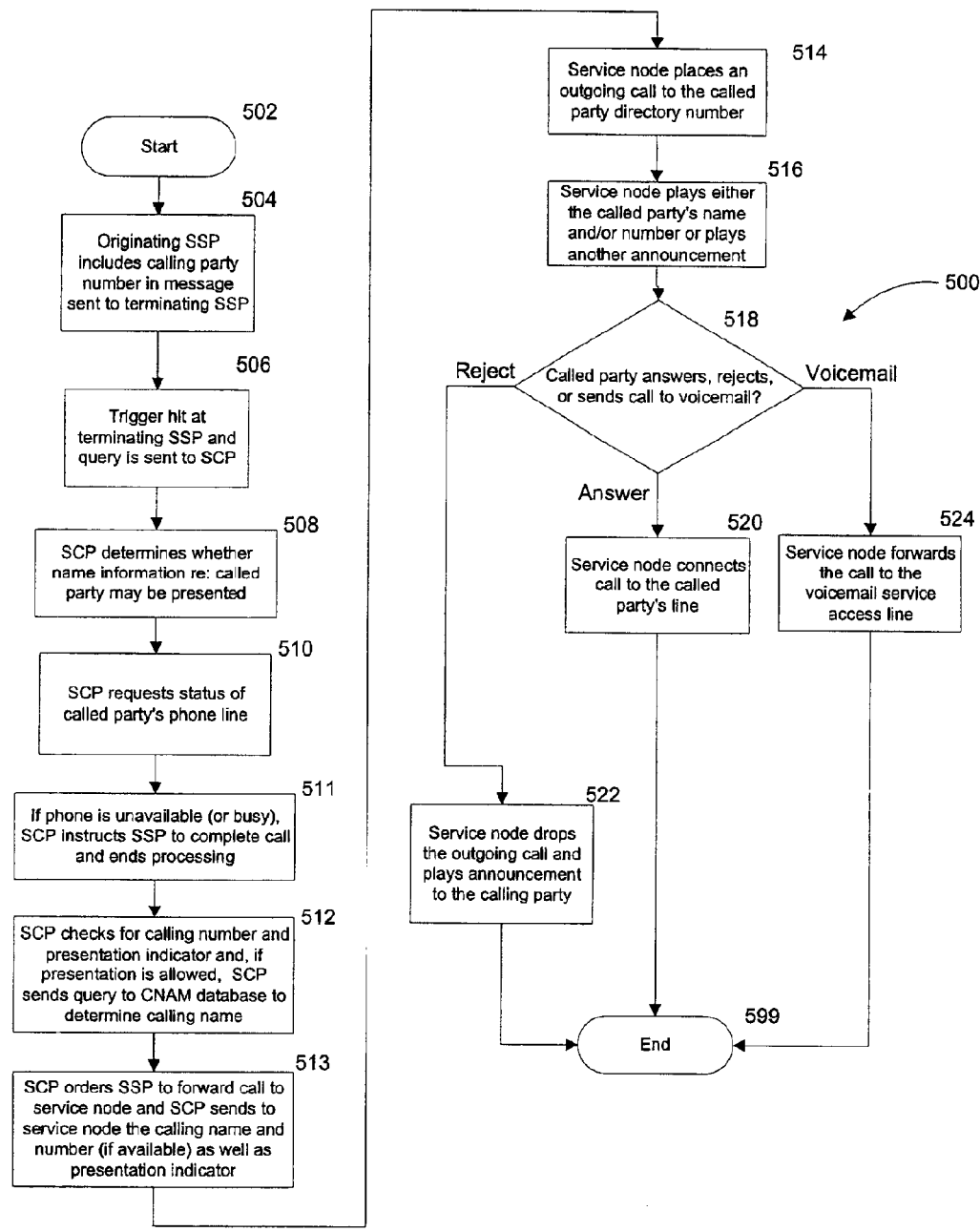
FIG. 4 is a flow diagram illustrating a method for providing an audio calling party name and number service to a wire line telephone in accordance with embodiment of the present invention.

FIG. 4 is a flow diagram illustrating a method 500 for providing audio calling party name and number service to a wire line telephone in accordance with embodiment of the present invention.

The method 500 begins at start step 502 when the calling party uses a telephone, such as telephone 221, to place a call to a called party telephone, such as telephone 224, by dialing a wireline called party number.

At step 504, the originating SSP 212 (or the originating MSC if the calling party is calling with a wireless phone) includes a calling party number in an SS7 message that is delivered to a terminating SSP 214 (associated with the called party's wireline phone).

At step 506, a trigger is hit at the terminating SSP and a query is sent to the SCP 242.

At step 508, the SCP 242 determines whether the calling party number is valid and whether name and number information regarding the calling party may be presented. For example, a presentation indicator for the calling party number may indicate "Presentation allowed", "Presentation restricted" or "Number Unavailable".

At step 510, the SCP requests the status of the called party's line to determine whether it is available or busy.

At step 511, if the called party's line is busy, then the SCP instructs the SSP to complete the call and ends processing. However, if the called party's line is available, then the method proceeds to step 512.

At step 512, the SCP 242 checks the calling number and presentation indicator corresponding to the calling party number and, if presentation is allowed, the SCP sends a query to the CNAM database to determine the calling name. The SCP may present the calling party number to the CNAM database, and in return it will get a text string with the name of the calling party, or it will get an "unavailable" or "unknown" result. If the calling party is calling from a cell phone, a network element within the cell network may detect that the call comes from a cell phone within the network and then send a request to the appropriate database to get the calling name of the calling party. The method then proceeds to step 513.

At step 513, the SCP orders the SSP to forward the call to the service node and the SCP sends to the service node the calling name and number (if available) as well as the presentation indicator.

At step 514, the service node 260 places an outgoing call to the called party's directory number. The method then proceeds to step 516.

At step 516, when the called party answers the call, the service node 260 plays the called party's name and/or number to the called party. Alternatively, if the calling party's name/number is unavailable or private, a message indicating this may be played to the called party. It should be understood that if the name of the calling party is not available in the database, then the calling party's number may be audibly transmitted to the called party. It should further be understood that if the calling party has marked his number as private or has an unlisted phone number then a message indicating that the call is a private call is audibly transmitted to the called party. The method then proceeds to decision step 518.

At decision step 518, it is determined whether the called party has answered the call, rejected the call, or sent the call to voice mail. If the called party has answered the call, then the method proceeds to step 520. At step 520, the service node 260 connects the call between the calling party's line and the called party's line. The method 500 then ends at step 599.

If it is determined at decision step 518 that the called party has rejected the call, then the method proceeds to step 522.

At step 522, the service node 260 drops the outgoing call and plays an announcement to the calling party. The method then ends at step 599.

If, at decision step 518, it is determined that the called party has selected to send the call to voice mail, then the method proceeds to step 524. At step 524, the service node 260 forwards the call to the voice mail service access line for voice mail service. The method then ends at step 599.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. In a telecommunications system comprising an advanced intelligent network (AIN) wireline network connected to a wireless network, a method for providing an audio calling name and number feature to a wireless telephone in association with a telephone call from a calling party telephone to the wireless telephone, the method comprising the steps of:

sending a message from an originating switch associated with the calling party telephone to a terminating switch associated with the wireless telephone, wherein the message comprises the directory number of the calling party telephone;

tripping a wireless trigger at the terminating switch and, in response, sending a query to a service control point (SCP);

querying a home location register (HLR) associated with the wireless telephone to determine whether the wireless telephone is available;

if the wireless telephone is available, then querying a database of subscriber information connected to the SCP to determine a calling name associated with the directory number of the calling party telephone;

forwarding the calling name and the directory number associated with the calling party telephone to a service node;

placing a call from the service node to the wireless telephone; and playing an audio annunciation of the calling name and the directory number.

2. The method of claim 1 wherein the calling name and the directory number are retrieved from the database by the SCP.

3. The method of claim 1 further comprising the steps of:
determining that the called party has rejected the call; and
dropping the outgoing call and playing an announcement to the calling party.

4. The method of claim 3 wherein the rejection is an audible rejection from the called party.

5. The method of claim 3 wherein the rejection comprises a keypad input from the keypad of the wireless telephone.

6. The method of claim 1 further comprising the steps of:
determining that the called party has accepted the call; and
connecting the call to the wireless telephone.

7. The method of claim 6 wherein the acceptance is an audible acceptance from the called party.

8. The method of claim 6 wherein the acceptance comprises a keypad input from the keypad of the wireless telephone.

9. The method of claim 1 further comprising the steps of:
determining that the called party has sent the call to voicemail; and
connecting the call to the voicemail service of the wireless telephone.

10. The method of claim 9 wherein the sending is an audible order from the called party.

11. The method of claim 9 wherein the sending comprises a keypad input from the keypad of the wireless telephone.

12. An audio calling name method for audibly announcing to a calling party a calling name of a calling party in an Advanced Intelligent Network (AIN) in association with a call from the calling party to the called party, wherein the AIN includes a switch, a service node, and a service control point (SCP), wherein the service control point is functionally connected to the switch and the service node, wherein the service control point is connected to a database of subscriber information including a list of calling names associated with directory numbers, and wherein the audio calling name method comprises the steps of:

sending a calling party number associated with the calling party in a message to a terminating mobile switching center (MSC) associated with a wireless telephone of the called party;

sending a query from the MSC to the SCP;

retrieving, from the database of subscriber information connected to the SCP, the calling name associated with the calling party number;

forwarding the calling name and calling party number to the service node;

placing an outgoing call from the service node to a directory number associated with the called party; and playing an announcement to the called party, wherein the announcement comprises an audible annunciation of the calling name associated with the calling party number.

13. The method of claim 12 wherein the announcement further comprises an audible announcement of the calling party number.

14. The method of claim 12 further comprising the steps of determining whether the wireless telephone of the called party is available by querying a home location register (HLR) associated with the wireless telephone and if not, then playing a busy signal to the calling party.

15. The method of claim 12 wherein the announcement further comprises a list of possible ways for the called party to direct the call from the service node.

16. The method of claim 15 wherein the list comprises a rejection choice which allows the called party to reject the call and wherein a signal will be connected between the calling party and the called party.

17. The method of claim 15 wherein the list comprises an acceptance choice which allows the called party to answer the call and wherein a call will be connected between the calling party and the called party.

18. The method of claim 15 wherein the list comprises a voicemail choice which allows the called party to reject the call and wherein the calling party will be connected with the voicemail service for the called party.

19. A telecommunications system for providing an audio calling name and number associated with a calling party to a called party, comprising:

a database of subscriber information including a list of calling names associated with directory numbers;

a service node;

a service control point connected to the database of subscriber information, the service control point operative to
- receive a query including a calling party number associated with the calling party;
- query the database of subscriber information to determine a calling name associated with the calling party number;
- forward the calling name and the calling party number to the service node; and the service node operative to
- place a call to the called party; and
- play an announcement to the called party, wherein the announcement comprises an audio annunciation of the calling name and the calling party number associated with the calling party.

20. The telecommunications system of claim 19, wherein the service control point is further operative to determine whether presentation of the calling name and the calling party number to the called party is allowed.

* * * * *

UNITED STATES PATENT AND TRADEMARK OFFICE
CERTIFICATE OF CORRECTION

PATENT NO. : 6,868,268 B2
DATED : March 15, 2005
INVENTOR(S) : Worsham et al.

It is certified that error appears in the above-identified patent and that said Letters Patent is hereby corrected as shown below:

Column 10,
Liens 52-53, "wherein a signal will be connected between the calling party and the called party." should read -- wherein a signal will be transmitted to the calling party. --.

Signed and Sealed this

Sixth Day of September, 2005

JON W. DUDAS
*Director of the United States Patent and Trademark Office*